(12) United States Patent
Hoffmann et al.

(10) Patent No.: US 8,573,857 B2
(45) Date of Patent: Nov. 5, 2013

(54) PLUG CONNECTOR FOR OPTICAL WAVEGUIDES

(75) Inventors: Rita Hoffmann, Rahden (DE); Martin Luckemeier, Rahden (DE); Mark Lindkamp, Lubbecke (DE)

(73) Assignee: Harting Electronics GmbH (DE)

( * ) Notice: Subject to any disclaimer, the term of this patent is extended or adjusted under 35 U.S.C. 154(b) by 238 days.

(21) Appl. No.: 13/304,164

(22) Filed: Nov. 23, 2011

(65) Prior Publication Data

US 2012/0070120 A1 Mar. 22, 2012

Related U.S. Application Data

(63) Continuation-in-part of application No. PCT/DE2011/075028, filed on Feb. 21, 2011.

(51) Int. Cl.
*G02B 6/36* (2006.01)

(52) U.S. Cl.
USPC .................................................. 385/78

(58) Field of Classification Search
USPC .................................................. 385/56, 78
See application file for complete search history.

(56) References Cited

U.S. PATENT DOCUMENTS

| | | | | |
|---|---|---|---|---|
| 5,157,749 A | 10/1992 | Briggs et al. | | 385/60 |
| 5,285,510 A | 2/1994 | Slaney | | 385/78 |
| 5,293,582 A | 3/1994 | Beard et al. | | 385/78 |
| 6,331,079 B1 | 12/2001 | Grois et al. | | 385/53 |
| 6,485,194 B1 | 11/2002 | Shirakawa | | 385/78 |
| 6,945,704 B2 | 9/2005 | Yamaguchi | | 385/60 |
| 7,326,073 B2 | 2/2008 | Hanning et al. | | 439/344 |
| 7,357,579 B2 | 4/2008 | Feldner | | 385/56 |
| 2002/0076165 A1 | 6/2002 | Childers et al. | | 385/78 |
| 2007/0249218 A1 | 10/2007 | Hanning et al. | | 439/517 |
| 2008/0101751 A1* | 5/2008 | Luther et al. | | 385/59 |
| 2008/0205823 A1* | 8/2008 | Luther et al. | | 385/59 |

FOREIGN PATENT DOCUMENTS

| | | | | |
|---|---|---|---|---|
| DE | 9314172.6 | 12/1993 | | G02B 6/36 |
| DE | 10114144 | 10/2002 | | G02B 6/36 |
| DE | 10325825 | 1/2004 | | G02B 6/36 |
| DE | 102006000702 | 4/2007 | | G02B 6/36 |
| DE | 102006019335 | 10/2007 | | G02B 6/36 |
| WO | WO 2004027482 | 4/2004 | | G02B 6/42 |
| WO | WO 2011107091 | 9/2011 | | G02B 6/38 |

OTHER PUBLICATIONS

German Examination Report issued in German Application Serial No. 10 2009 011 388.6 dated Oct. 7, 2009 (4 pgs).

(Continued)

*Primary Examiner* — Sung Pak
(74) *Attorney, Agent, or Firm* — Hayes Soloway P.C.

(57) ABSTRACT

A special plug connector is proposed for contacting a mating plug using a standard plug connector, such that the dimensions of the mating plug differ from this standard plug connector in both horizontal and vertical directions. This special plug connector has a plug connector housing with two bearing pins and a holding element for holding two respective ferrule housings. Firstly, the holding element is elastically connected by a first spring element to the plug connector housing. Secondly, the holding element having two arms, each of which has a corresponding elongated hole, is rotatable within a certain angular range about the bearing pins of the insert under the influence of a spring and is held on the plug connector housing, so that it is displaceable by a first displacement path axially to the ferrules under the influence of a spring.

10 Claims, 4 Drawing Sheets

(56) References Cited

OTHER PUBLICATIONS

European Search Report dated May 12, 2010 issued in 10001738.3-1234 (6 pgs).

International Search Report issued in German Application No. PCT/DE2011/075028 dated Aug. 10, 2011 (4 pgs).
International Preliminary Report on Patentability; PCT/DE2011/075028, Dated Sep. 25, 2012 (7 pgs).

* cited by examiner

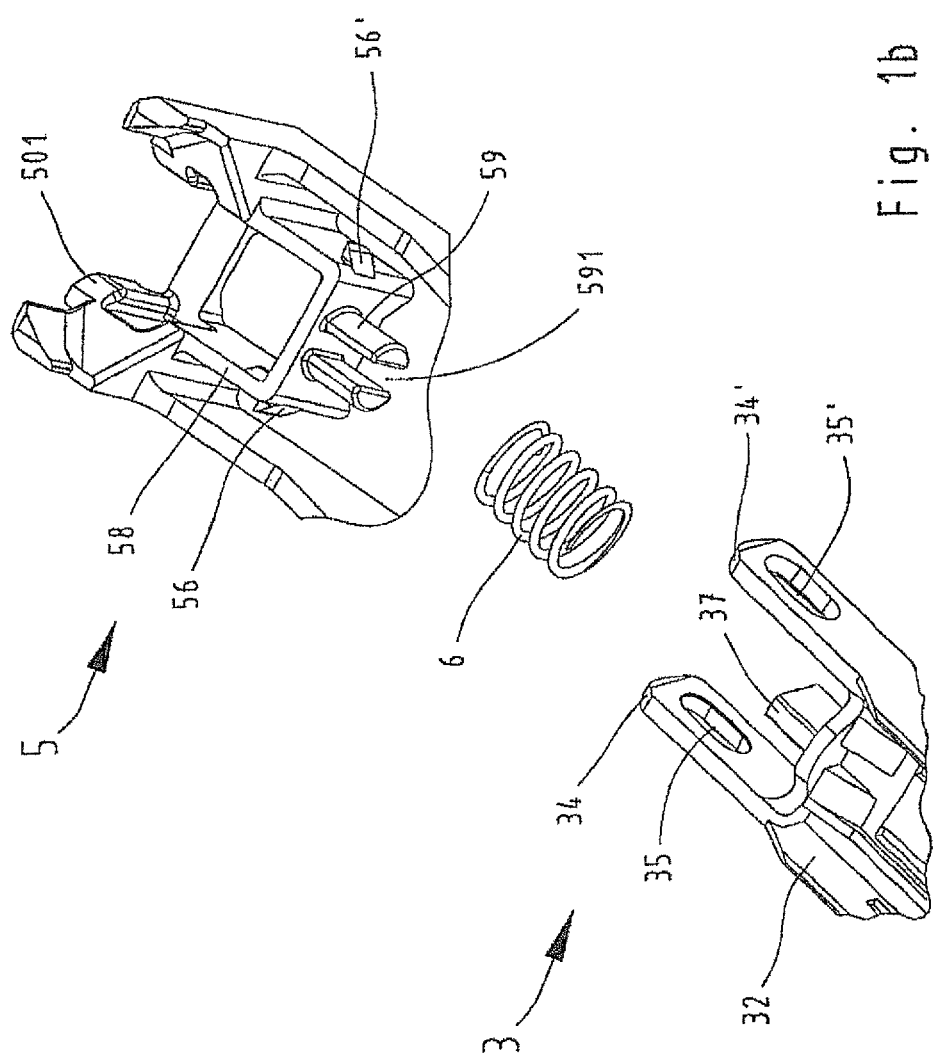

PLUG CONNECTOR FOR OPTICAL WAVEGUIDES

CROSS REFERENCE TO RELATED APPLICATION

This application is a continuation-in-part of my U.S. National Phase Application of PCT/DE/2011/075028, filed Feb. 21, 2011.

FIELD OF THE INVENTION

The invention relates to a plug connector for optical waveguides, in particular for insertion into and contacting with a mating plug connector, which is equipped with an opto-electrical receiver.

BACKGROUND OF THE INVENTION

Such a plug connector is needed to implement a recommended minimum contact pressure of the optical waveguide to be connected on the opto-electrical receiver in the mating plug connector on the one hand, and on the other hand to achieve a secure plug position, even with differing dimensions of the mating plug.

It is known in the related art that the mating plugs may be affixed directly to circuit boards.

It is mentioned in the document WO 2004027482A1 that the dimensions of such mating plugs affixable to circuit boards constitute specific embodiments. Thus, none of the standardized optical plug connectors (e.g., of the LC or LX.5 type or the like) may be used for the optical connection. Accordingly, this document proposes a connection device, which can be adapted flexibly like a module to optical plug connector systems according to different standards. The connection device comprises a base part, which is independent of the respective plug connector and is attached to the surface of the circuit board while also surrounding the opto-electrical component. The connection device additionally comprises a coupling part, which is coordinated with the respective plug connector system and is connected to the base part toward the outside while being attached to the base part and having an insertion opening for inserting the standardized fiber optical plug connector.

One disadvantage of this connecting device is that a special coupling system must be provided and attached to the base part for each plug connector system.

The document U.S. Pat. No. 6,331,079B1 discloses a mounting system for a plug connector arrangement on a substrate.

In the related art there is the problem that mating plugs of differing dimensions can be found on the market, so the user is confronted with compatibility problems accordingly.

SUMMARY OF THE INVENTION

The objective of the present invention is therefore to provide a plug connector that can be manufactured inexpensively, conforming, on the one hand, at least to a conventional standard in its dimensions, while, on the other hand, also being usable with mating plugs whose dimensions deviate from this standard. In particular the plug connector may be used with such conventional mating plugs, which are available on the market and are equipped with opto-electrical converters and may be secured directly on a circuit board.

This objective is achieved in one aspect by a plug connector that has a plug connector housing having two bearing pins, and the plug connector also has a holding element for holding two ferrule housings belonging to it, such that each of these ferrule housings is provided for holding a ferrule with an optical waveguide embedded in it, such that the holding element is elastically connected to the plug connector housing via a first spring element, and the holding element also has two parallel arms, each having an elongated hole, with which the holding element is rotatably acted upon by a spring within a certain angular range about the bearing pin and is held on the plug connector housing so that it is displaceable by a first displacement pathway by a spring acting axially to the ferrules.

In one aspect the invention provides a device for securing a connector in a housing, wherein the housing contains a connecting region with at least one locating biasing member, such as a spring, arranged therein. One end of the biasing member is aligned in a connecting direction and protrudes into the connecting region, whereby to generate a wedge effect against the walls of the connector and to compensate for misalignments between the connector and the housing.

The invention also relates to a plug connector for optical waveguides, which automatically compensates for the geometric deviations of different mating plugs without any particular measures. In particular, not only are different depths of insertion axially to the optical waveguide automatically compensated but also deviations in the mating plug perpendicular thereto are compensated.

Such a mating plug is preferably a small form-factor plug-in (SFP) transceiver, which is preferably inserted into and locked in a metal cage, such that the metal cage is situated on a circuit board with a base area, which includes electrical contacts. On the one hand, the SFP transceiver has optical connections and an opto-electrical converter, and on the other hand, it also has electrical connections, which contact a card edge connector (mezzazine) in the rear part of the metal cage and are thereby electrically connected to the circuit board. One opening in the metal cage is connected to a housing wall of a device housing surrounding the circuit board. At this location, the housing wall has an opening, which is sealed by an adapter housing or a screw-on housing from the other side of the housing wall. The mating plug connector is thereby contacted with an inventive plug connector.

In this contacting operation, the optical waveguides of the plug connector held in the ferrules should be pressed against the optical connections of the mating plug with a recommended pressure of approximately 5 N in order to ensure an optimal transfer of the optical signals.

It is advantageous here that the holding element is displaceable by a first displacement path by the first spring element acting on it because the plug connector is thereby adapted to the dimensions of the mating plug connector horizontally in the direction of the ferrule axis.

It is also advantageous if the first spring element is a spiral spring because this ensures an almost constant force of 15 N, for example, over the first displacement path. Taking into account the dimensions of conventional mating plug connectors available on the market, a first displacement path between 2.5 mm and 3 mm has been found to be advantageous in particular.

It is also advantageous that the holding element is rotatable within a certain angular range about the bearing pins of the insert under the influence of a spring; in particular the holding element is rotatably mounted with its arms on the two bearing pins because the plug connector is thereby adapted to the dimensions of the mating plug connector not only horizontally in the direction of the ferrule axis but also vertically, i.e., at a right angle to the ferrule axis. Vertical geometric deviations in the mating plug can thus also be compensated. Taking into account the dimensions of conventional mating plugs available on the market, it has proven to be advantageous in particular that deviations in the mating plug amounting to approximately 0.8 mm perpendicular to the ferrule axis can be compensated. It is advantageous for this in particular if the holding element is equipped with lateral plate springs because a starting position that complies with the standard is thereby also established in the vertical direction of the basic state. The minimal change in the direction of the optical conductor which results when there is a vertical deflection of the holding element is thereby compensated by existing clearances of the ferrules in their ferrule housings.

To implement the horizontal translatory motion as well as the vertical rotational motion of the holding element with the most inexpensive means possible, it is advantageous in particular that elongated holes pointing in the direction of the ferrule axes are provided in the arms of the holding element. These elongated holes extend around the bearing pins, so that the holding element is displaceable in the direction of the ferrule axes and is attached to the bearing pins rotatably at a right angle thereto.

It is advantageous in particular if each of the two ferrules of the plug connector is spring-mounted within its ferrule housing by means of an additional spring and is mounted to be axially displaceable by a second displacement path. It is additionally advantageous if the sum of the spring constants of the two additional springs is smaller than the spring constant of the first spring element because the spring mechanism of the first spring element is manifested only when the ferrule housing of the plug connector strikes against the mating plug with the ferrules completely inserted into it. This is of particular advantage because the predetermined contact pressure of the ferrules against the optical connections of the mating plug of approximately 5 N is thereby ensured. This is true in particular when the ferrules can be inserted completely into the ferrule housing.

The two additional springs, with which the ferrules are spring mounted within their ferrule housings, can compensate for length differences of up to 1.3 mm via the second displacement path. Since the holding element has corresponding elongated holes in its arms, with which it surrounds the bearing pins and is thus mounted in the housing, so that it is displaceable axially to the ferrules, the first spring element by which the holding element is elastically connected to the housing can compensate for even greater differences in length of 2.8 mm, for example, via the first displacement path. On the whole, insertion depths with differences of a total of approximately 4 mm can be compensated in this configuration.

To compensate for the unavoidable curvature in the optical waveguide within the plug housing in shortening the displacement path of the shift housing, a certain minimum length of the housing is necessary.

It is advantageous in particular if the plug connector housing is embodied in multiple pieces and comprises an outer housing as well as an insert inserted into it because in this way universal plug connector housings may be used as the outer housing, which also lowers the cost of production.

It is also advantageous if the holding element consists of an elastically deformable material because its parallel arms with their elongated holes are shifted over the rounded bearing pins of the housing in assembly of the plug connector and are locked onto them. It is advantageous here if the bearing pins are arranged on two parallel outer walls of a rectangular integral molding of the holding element and have inclined sliding surfaces accordingly.

If the holding element is made of an elastically deformable material, this also lowers production costs because then the lateral plate springs may be embodied in one piece together with the holding element.

BRIEF DESCRIPTION OF THE DRAWINGS

One exemplary embodiment of the invention is illustrated in the drawings and explained in greater detail below, where FIG. 1b shows a relevant detail from the exploded diagram from a different angle, of view with a holding element, a spring element and an insert.

DETAILED DESCRIPTION OF THE INVENTION

Figure 1A:
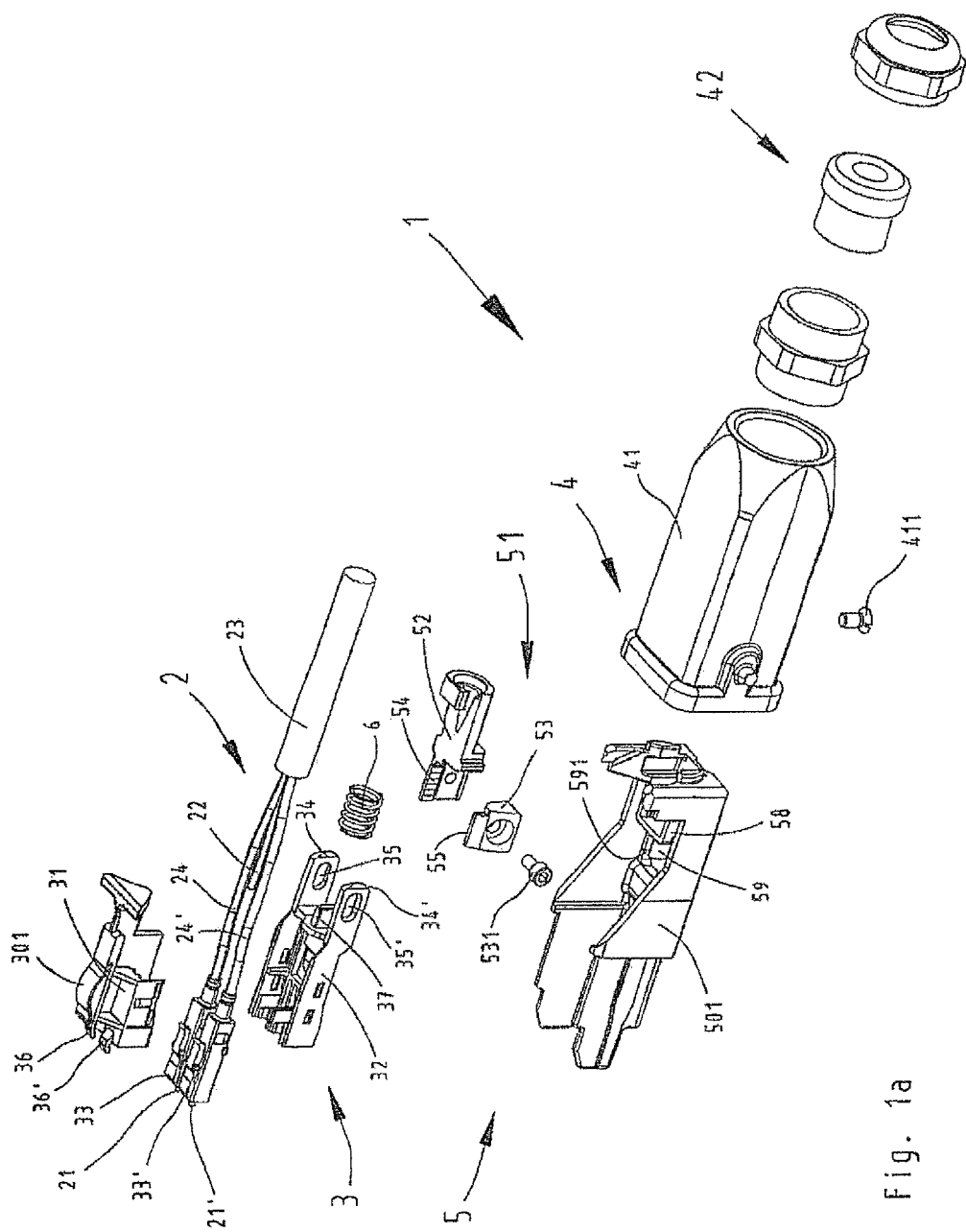
FIG. 1a shows an exploded diagram of a plug connector.

FIG. 1a shows an exploded diagram of a plug connector 1 for optical waveguides 24, 24' with its individual parts. This plug connector 1 comprises a holding element 3 with a top part 31 and a bottom part 32 as well as two respective ferrule housings 33, 33', each of which is intended to hold one ferrule 21, 21' with an optical waveguide 24, 24' embedded therein. The optical waveguides 24, 24' together with a strain relief element 22 and a sheathing 23 are a part of an optical waveguide cable 2.

In addition, plug connector 1 includes a plug connector housing 4 comprising an outer housing 41 and an insert 5, which is produced by the zinc casting method. The insert 5 comprises a holder 501 and a clamping element 51.

The clamping element 51 comprises a block 52 and a clamp 53 that can be screwed to it. The block 52 and the clamp 53 each have a free standing clamping plate 54, 55 provided for being pressed together when screwed together using a first screw 531 and thereby clamping the strain relief element 22 provided in the optical waveguide cable 2 between one another for strain relief of the optical waveguide cable 2. The insert 5 can be inserted into an outer housing 41 belonging to the plug connector housing 4. In addition, the outer housing 41 comprises a multipiece cable screw connection 42, by means of which the optical waveguide cable 2, which is passed through the outer housing 41 can be guided and to which it can be screwed.

FIG. 1b shows especially well how the holding element 3, which is made of an elastically deformable material, can be connected to the insert 5 via the first spring element 6.

The holder 501 of the insert 5 has a rectangular integral molding 58, enclosing an internal cavity. A cylindrical integral molding 59 having a guide slot 591 is integrally molded on the rectangular integral molding 58.

The holding element 3 has a flat guide pin 37, which is arranged parallel to and centrally between the two arms 34, 34'.

The first spring element 6, which is embodied in the form of a spiral spring, is pushed over the cylindrical integral molding 59 in assembly of the plug connector 1 and is held there. The arms 34, 34' of the holding element 3 are pushed over the bearing pins 56, 56', which have inclined sliding faces for this purpose (not shown in detail in the drawing). The arms 34, 34' with their elongated holes 35, 35' are then locked on the bearing pins 56, 56'. At the same time the flat guide pin 37 engages in the first spring element 6, which is in the form of a spiral spring and is inserted under corresponding spring tension into the guide slot 591 of the cylindrical integral molding 59.

Figure 2:
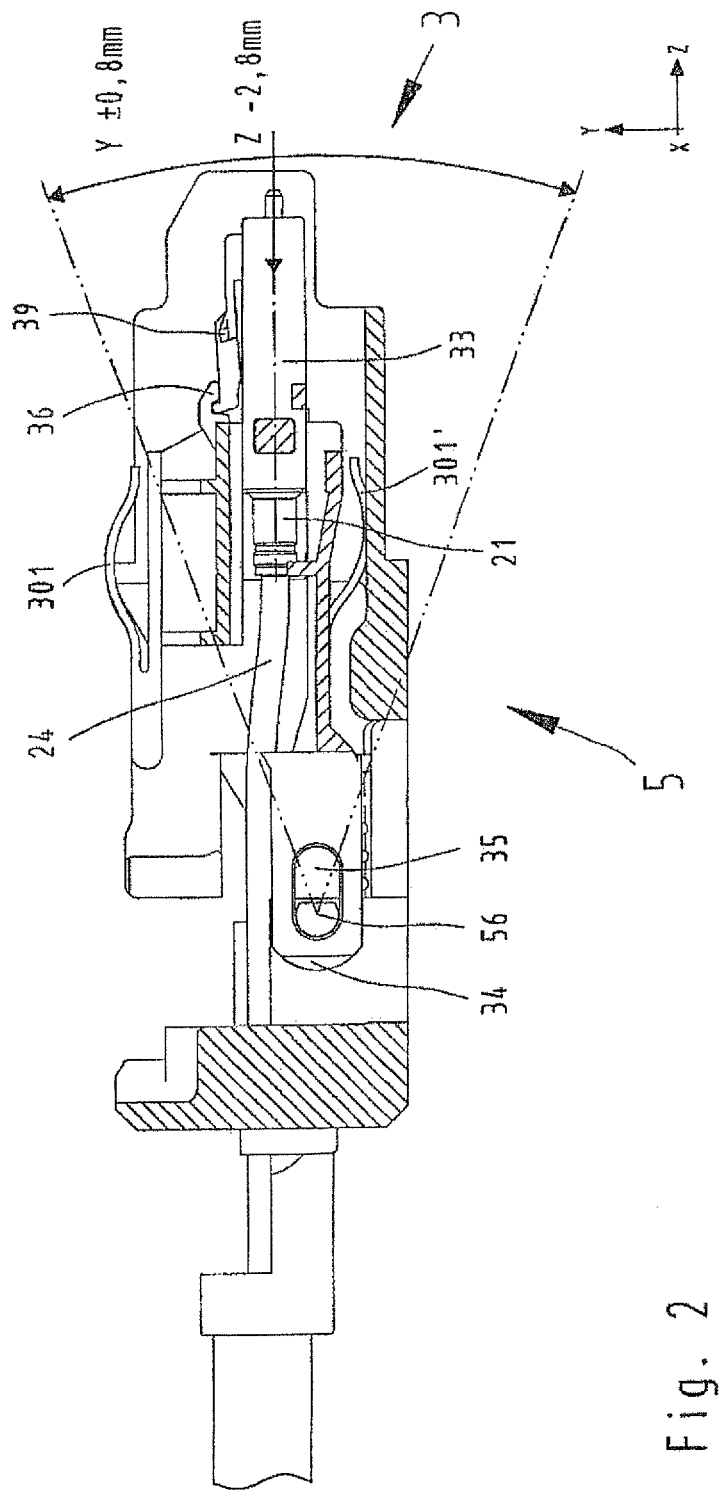
FIG. 2 shows a side of the insert with the holding element.

FIG. 2 shows a part of the plug connector 1 in a side view with the direction of view along the X axis of a coordinate system. This view shows the holding element 3 and a respective arm 34 with an elongated hole 35. The elongated hole 35 extends around the bearing pin 56 of the insert 5, at the same time permitting a translatory motion of the holding element 3 in Z direction and a slight rotational motion of the holding element 3 about an X axis in Y direction. The remaining course of a side wall of the holding element 3 connected to the arm is not shown here, thereby revealing a view of the internal structure. Lateral plate springs 301, 301' are integrally molded and secured on one side on two opposite ends of the insert 5. These plate springs 301, 301' center the holding element 3 and thus the ferrules 21, 21' in the base state of the assembled plug connector 1 in compliance with the standard. In addition, the holding element 3 has a protrusion 36 for each ferrule housing 33, pressing down on a catch device 39 of the respective ferrule housing 33 to prevent it from being locked in the mating plug.

Figure 3:
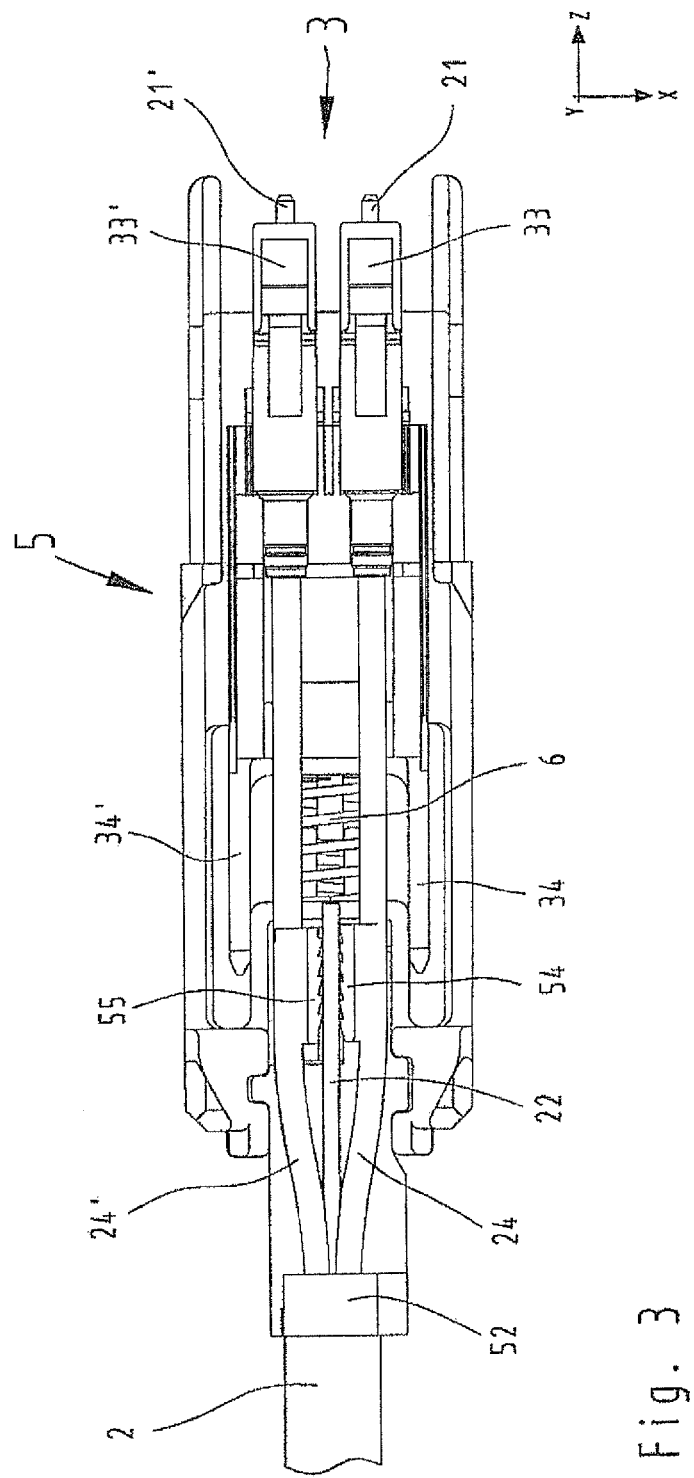
FIG. 3 shows a top view of the insert with the holding element.

In a view from above, FIG. 3 shows a part of the plug connector 1 without the top part 31, with the direction of view being along the Y axis of the coordinate system. The strain relief mechanism can be seen well here in particular. The two clamping plates 54, 55 clamp the strain relief element 22 of the optical waveguide cable 2 between them.

When assembled, the optical waveguide cable 2 together with its ferrules is guided first through the cable screw connection and through the outer housing. Then the ferrule housing 33, 33' is inserted into the bottom part 32 and locked there. Next the top part 31 is placed on the bottom part 32 and locked there with locking means. The first spring element 6 is pushed over the cylindrical integral molding 59. Next the flat guide pin 37 of the holding element 3 is inserted into the spring element 6 and pushed into the guide slot 591 under a corresponding spring tension. At the same time, the arms 34, 34' of the holding element 3 are pushed over parallel side walls of the rectangular integral molding 58 and over inclined sliding faces of the bearing pins 56 arranged on facing walls of the rectangular integral molding 58. Next the arms 34, 34' with their elongated holes 35, 35' are locked onto the bearing pins 56.

The strain relief element 22 of the optical waveguide cable 2 is arranged between the clamping plates 54, 55 in the clamping element 51. With a first screw 531, the clamp 53 is screwed against the block 52. The strain relief element 22 is thereby clamped between the clamping plates 54, 55. The clamping element is then inserted into the internal cavity in the rectangular integral molding 58 of the insert 5, ensuring a strain relief of the optical waveguide cable 2.

The arrangement consisting of the insert 5 and the holding element 3 is then inserted into the outer housing 41 and screwed tightly there using a second screw 411.

The optical waveguide cable 2 is affixed to the outer housing 41 by means of the cable screw connection 42.

LIST OF REFERENCE NUMERALS

Plug Connector for Optical Waveguide
Ref.: P210-10 US 0
0 plug connector
2 optical waveguide cable
21, 21' ferrules
22 strain relief element
23 sheathing
24, 24' optical waveguide
3 holding element
301, 301' plate springs
31 top part
32 bottom part
33, 33' ferrule housing
34, 34' arms
35, 35' elongated holes
36, 36' protrusions
37 flat guide pin
39, 39' locking device
4 plug connector housing
41 outer housing
411 second screw
42 cable screw connection
5 insert
501 holder
51 clamping element
52 block
53 clamp
531 first screw
54, 55 clamping plates
56, 56' bearing pin
58 rectangular integral molding
59 cylindrical integral molding
591 guide slot
6 first spring element

The invention claimed is:

1. A plug connector for optical waveguides, in particular for connecting and contacting a mating plug connector, which is equipped with an opto-electrical converter, such that the plug connector has a plug connector housing with two bearing pins, and the plug connector also has a holding element for holding two ferrule housings belonging to it, such that each of these ferrule housings is provided for a holding a ferrule with an optical waveguide embedded therein, such that the holding element is elastically connected to the plug connector housing via a first spring element, and the holding element has two parallel arms, each having an elongated hole, with which the holding element is also rotatable within a certain angular range about the bearing pins under the influence of a spring, is held on the plug connector housing, so that it is displaceable by a first displacement path axially to the ferrules under the influence of a spring.

2. The plug connector according to claim 1, wherein the plug connector housing is embodied in multiple pieces and comprises an outer housing as well as an insert inserted therein, such that the two bearing pins are part of the insert.

3. The plug connector according to claim 1, wherein the first spring element is embodied in the form of a spiral spring.

4. The plug connector according to claim 1, wherein the holding element has at least one lateral plate spring for centering it within the plug connector.

5. The plug connector according to claim 4, wherein the holding element consists of an elastically deformable material, and the at least one lateral plate spring is embodied in one piece together with the holding element.

6. The plug connector according to claim 4, wherein the at least one lateral plate spring comprises two plate springs, which are arranged on opposite sides of the holding element.

7. The plug connector according to claim 1, wherein each ferrule is mounted elastically by an additional spring within its ferrule housing and is axially displaceable by a second displacement path.

8. The plug connector according to claim 7, wherein the second displacement path is shorter than the first displacement path.

9. The plug connector according to claim 7, wherein the sum of the spring constants of the two additional springs is smaller than the spring constant of the first spring element.

10. The plug connector according to claim 5, wherein the at least one lateral spring comprises two plate springs, which are arranged on opposite sides of the holding element.

* * * * *

UNITED STATES PATENT AND TRADEMARK OFFICE
CERTIFICATE OF CORRECTION

PATENT NO. : 8,573,857 B2  Page 1 of 1
APPLICATION NO. : 13/304164
DATED : November 5, 2013
INVENTOR(S) : Hoffmann et al.

It is certified that error appears in the above-identified patent and that said Letters Patent is hereby corrected as shown below:

On the title page, item (75)

"Mark Lindkamp" should be --Marc Lindkamp--

Signed and Sealed this
Fourteenth Day of October, 2014

Michelle K. Lee
*Deputy Director of the United States Patent and Trademark Office*